J. D. CASEY.
AUTOMOBILE WHEEL.
APPLICATION FILED JULY 18, 1914.

1,127,960.

Patented Feb. 9, 1915.
2 SHEETS—SHEET 1.

Witnesses:
J. K. E. Diffenderffer
M. Storm

Inventor:
James D. Casey
By Chapin & Ferguson
Attorney.

UNITED STATES PATENT OFFICE.

JAMES D. CASEY, OF BALTIMORE, MARYLAND.

AUTOMOBILE-WHEEL.

1,127,960.

Specification of Letters Patent.

Patented Feb. 9, 1915.

Application filed July 18, 1914. Serial No. 851,682.

*To all whom it may concern:*

Be it known that I, JAMES D. CASEY, a citizen of the United States, residing at Baltimore, in the State of Maryland, have invented certain new and useful Improvements in Automobile-Wheels, of which the following is a specification.

This invention relates to improvements in wheels, and has for its object to provide a device especially adapted for use on automobiles and motor vehicles whereby the pneumatic tires generally in use on such vehicles may be dispensed with, at the same time retaining the cushioned effect produced by said penumatic tires.

The invention consists of the novel construction and arrangement of parts and combination of parts hereinafter more fully set forth in the following specification and pointed out in detail in the claim.

Figure 1:
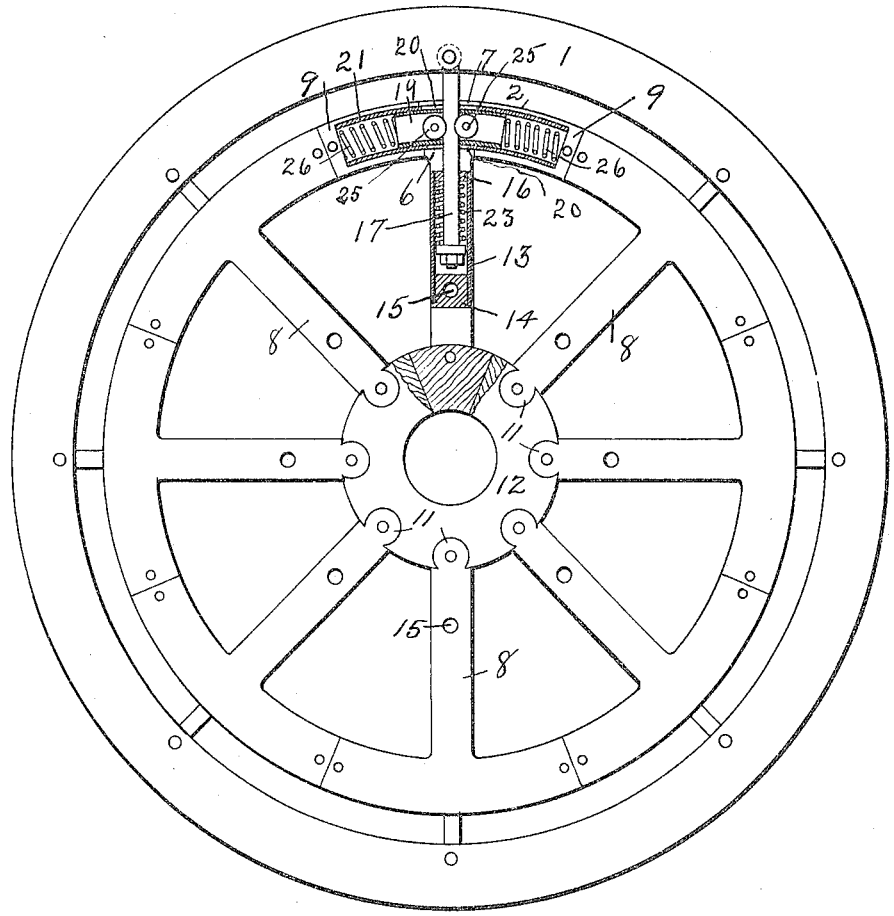
Figure 3:
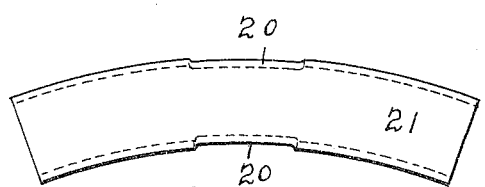
Figure 4:
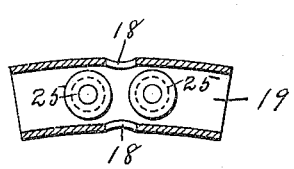
Figure 2:
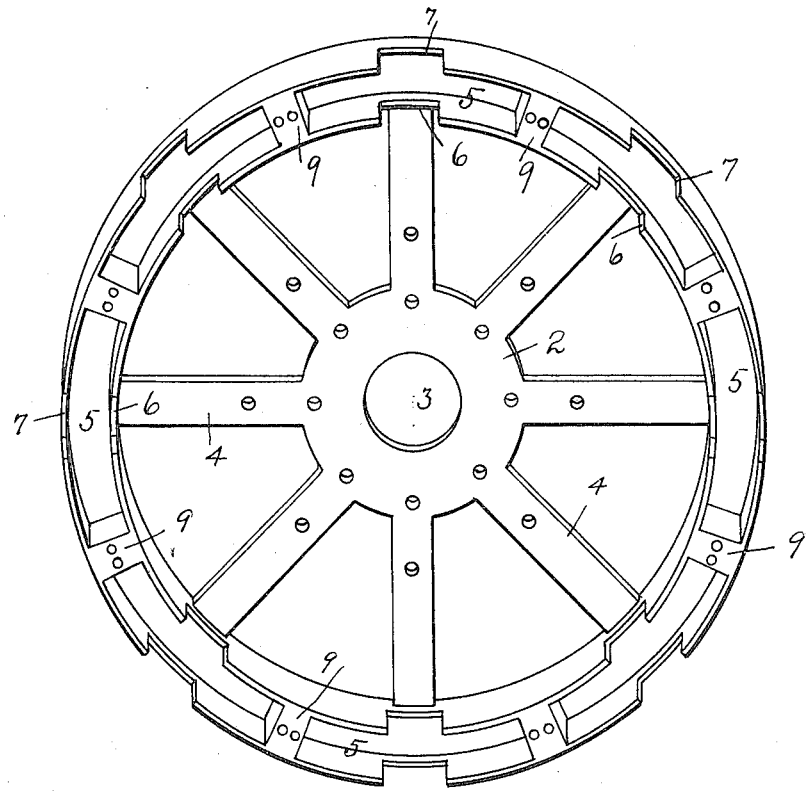
Figure 5:
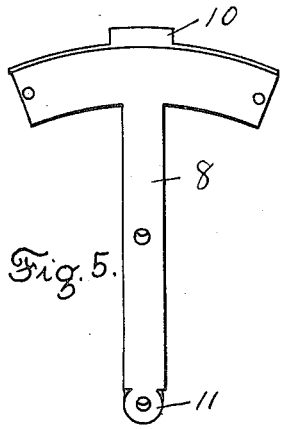
Figure 6:
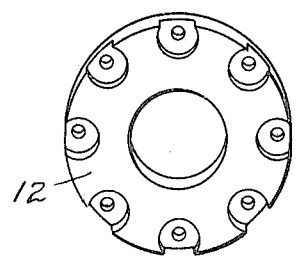

In the accompanying drawings, Figure 1 is a side elevation of my invention, partly in section. Fig. 2 is a perspective view of one face of the inner wheel. Fig. 3 is a side elevation of one of the segment-shaped stationary tubes which fit into the rim of the inner wheel. Fig. 4 is a longitudinal sectional view of one of the sliding tubes which operate in the stationary tubes. Fig. 5 is a perspective view of one of the removable spokes. Fig. 6 is a perspective view of the removable hub plate.

Referring to the accompanying drawings, forming part of this specification, and in which like reference numerals designate like parts throughout the several views thereof, 1 designates the outer wheel within which is flexibly connected the inner wheel. This inner wheel is composed of two faces, the face 2 of which has a central aperture 3 through which the axle projects, and a number of integral spokes 4. The rim of the inner wheel is provided with a number of recesses 5 in the inner surface, and cut-outs 6 and 7 at the center of said recesses 5. The other face of the inner wheel is composed of a number of removable spokes 8 having their outer ends resting against and secured to the partitions 9, and each having an angular bent projection 10, which projects partly into the cut-out 7, and their inner ends provided with the heads 11 which fit into similar-shaped recesses in the face of the removable hub plate 12. Between the hub plate 12 and the face 2 is a wooden block designed to keep the two faces of the wheel the proper distance apart and also to form a hub for the wheel. The axle of the vehicle projects through both faces of the wheel and through said wooden block. Between each of the removable spokes 8 and the integral spokes 4 of the face 2, is a cylinder 13 having a head 14 at its inner end and through which the pivot pin 15 passes. The said pin 15 passes through both the integral and the removable spokes, allowing a sidewise movement of said cylinders between said spokes. The outer end of each of the cylinders has a head 16 secured therein. These cylinders 13 are each provided with a rod 17 projecting through the outer end of the said cylinders and through the apertures 18 of the segment-shaped sliding tubes 19, through the apertures 20 in the segment-shaped stationary tubes 21 and through the cut-outs 6 and 7 of the inner wheel, and have their outer ends connected by the bolts 22 to the outer wheel 1. Within each cylinder 13 is a coiled spring 23 surrounding the rod 17 between the head 14 and the head 16, which serves to keep the inner and outer wheels in their proper relative position, and also to allow the said wheels to yield with respect to each other, thus producing the cushioned effect of the pneumatic tire. The stationary tubes 21 fit within the recesses 5 and the apertures therein are elongated to correspond with the cut-outs 6 and 7 to permit of the sidewise movement of the rods 17. The sliding tubes 19 are provided with apertures 18 through which the said rods 17 project, and two small wheels 25 between which the rods 17 operate. Between the ends of the sliding tubes 19 and the partitions 9 are coiled springs 26 which permit of the sidewise movement of said tubes 19 and the rods 17.

It will be seen that should anything happen to one of the cylinders, or the springs connected therewith, the same can be removed and repaired by simply removing the adjacent removable spoke 8 and disconnecting the outer end of the rod 17 from the outer wheel 1. Thus repairs to any of the cylinders or its operative parts may be made without disconnecting the inner and outer wheels.

The weight on the wheel will cause the coiled springs 23 to compress in the upper cylinders as the wheel turns, and the coiled springs 26 permit the rods 17 to move in the elongated cut-outs 6 and 7. By the use of these coiled springs 23 in the cylinders 13 and the coiled springs 26, solid tires may be used on the wheels with the same cushioned effect as that produced by the use of the pneumatic tires on the wheels in general use.

Having thus described my invention, what I claim is:

The combination of an outer wheel, an inner wheel having a plurality of recesses in one side of the rim thereof and an elongated cut-out at the inner and outer edge of each recess, a plurality of removable spokes each having a head on its inner end, a removable circular plate having recesses at the outer edge thereof into which the heads of the removable spokes fit, a stationary tube fitted into each recess in said inner wheel and each having elongated slots therein, a sliding tube fitted into each stationary tube and having apertures therein, two wheels mounted in each of said sliding tubes, a spring at each end of said sliding tubes to hold them in their normal position, a cylinder mounted between each of the spokes of the inner wheel, a rod projecting from each cylinder extending through the stationary and the sliding tubes and between the wheels in the sliding tube and having its outer end connected to the outer wheel, and a coiled spring in each cylinder surrounding the said rod.

In testimony whereof I affix my signature in presence of two witnesses.

JAMES D. CASEY.

Witnesses:
CHAPIN A. FERGUSON,
CHARLES E. GARITEE.